United States Patent [19]
Montagnino et al.

[11] Patent Number: 5,708,256
[45] Date of Patent: Jan. 13, 1998

[54] HEATING PAD CONTROLLER WITH VARIABLE DUTY CYCLE FOR TEMPERATURE ADJUSTMENT

[75] Inventors: James G. Montagnino, El Paso; Ronald Lerner, Houston; John Polonchak; Robert Sherwood, both of El Paso, all of Tex.

[73] Assignee: Kaz, Incorporated, New York, N.Y.

[21] Appl. No.: 573,948

[22] Filed: Dec. 18, 1995

[51] Int. Cl.[6] .................................................. H05B 1/02
[52] U.S. Cl. ........................ 219/497; 219/492; 219/212; 219/501; 323/288
[58] Field of Search ........................ 219/494, 497, 219/501, 505, 508, 212, 216, 483, 486; 307/117; 323/288

[56] References Cited

U.S. PATENT DOCUMENTS

| | | | |
|---|---|---|---|
| 2,819,371 | 1/1958 | Aldrich et al. | 219/20 |
| 3,329,887 | 7/1967 | Schaeve | 323/22 |
| 3,375,347 | 3/1968 | Seney | 219/499 |
| 3,700,933 | 10/1972 | Harkenrider et al. | 307/310 |
| 3,702,921 | 11/1972 | Thelen | 219/501 |
| 3,842,243 | 10/1974 | Gregory | 219/497 |
| 3,854,033 | 12/1974 | Edge | 219/483 |
| 4,002,882 | 1/1977 | Mc Cutchen | 219/499 |
| 4,238,672 | 12/1980 | Siess | 219/497 |
| 4,243,875 | 1/1981 | Chang | 219/497 |
| 4,277,670 | 7/1981 | Mori et al. | 219/492 |
| 4,283,619 | 8/1981 | Abe | 219/492 |
| 4,334,147 | 6/1982 | Payne | 219/497 |
| 4,777,350 | 10/1988 | Crockett et al. | 219/497 |
| 4,950,868 | 8/1990 | Moss et al. | 219/211 |
| 5,023,430 | 6/1991 | Brekkestran et al. | 219/486 |
| 5,032,705 | 7/1991 | Batcheller et al. | 219/211 |
| 5,105,067 | 4/1992 | Brekkestran et al. | 219/497 |
| 5,185,513 | 2/1993 | Pacileo | 219/497 |
| 5,302,807 | 4/1994 | Zhao | 219/211 |
| 5,317,130 | 5/1994 | Burkett et al. | 219/497 |

*Primary Examiner*—Mark H. Paschall
*Attorney, Agent, or Firm*—Darby & Darby

[57] ABSTRACT

A heating pad controller is provided which varies the duty cycle during which power is applied to a heating pad heating element. In one embodiment according to the present invention, an oscillator circuit is used to vary the off-time of the duty cycle, with the on-time portion being fixed. User control of the off-time is provided by way of a rotary control knob connected to a potentiometer. The potentiometer is part of the oscillator circuit and is used to vary the resistance through which a capacitor in the oscillator circuit charges up. The output of the oscillator circuit is used to control the gate of a silicon controlled rectifier (SCR), which acts as a power switch through which power is applied to the heating element. During power up, the oscillator circuit is overridden and a continuous control signal is applied to the SCR to provide constant power to the heating element to thereby achieve rapid heating. In an alternative embodiment according to the present invention, a digital heating pad controller is provided to vary the duty cycle during which power is applied to a heating pad heating element. User control is provided by way of a number of switches which are used to select one of a number of operating temperatures. Additionally, when the heating pad is first turned on or when the desired temperature setting is increased, continuous power, i.e., 100% duty cycle operation, is initiated in order to rapidly heat the heating pad to the desired temperature. Similarly, when the desired temperature setting is decreased, no power is applied to the heating element, i.e., 0% duty cycle operation.

7 Claims, 3 Drawing Sheets

HEATING PAD CONTROLLER WITH VARIABLE DUTY CYCLE FOR TEMPERATURE ADJUSTMENT

FIELD OF THE INVENTION

The present invention generally relates to the field of heating system controllers. More specifically, the present invention relates to a controller for a heating pad.

BACKGROUND OF THE INVENTION

Heating pads are commonly used by individuals to provide controlled and localized heating to particular body parts or areas. The heating pads may be incorporated into an article of clothing, such as a glove, or may be provided as a stand alone article to be placed on an area which is desired to be heated. Heating pads typically include a heating element, such as a large resistive element, which is heated by the application of A.C. power. Heating pads also include a thermostat or other temperature control interface which allows a user to vary and control the amount of heat provided by the heating pad.

Heating pad temperature control may be achieved by controlling the mount of power delivered to the heating element within the heating pad. The amount of power is in turn controlled by altering either the amount of continuous power applied to the heating element, or intermittently applying power to thereby alter the mount of time during which power is applied to the heating element. This latter approach to temperature control is often referred to as "duty cycle" control, since it is the mount of on-time and off-time of the applied power that is being controlled.

Conventional heating pad controllers typically include a thermostat for sensing the heating pad temperature and turning off power to the heating element once the heating pad has reached a desired temperature. An additional "tickler" heater in thermal contact with the thermostat is selectively turned on to accelerate the turn-off of the thermostat and thus provide a lower heating pad temperature setting since shorter duty cycles, thus less power is being delivered to the heating element of the heating pad.

FIG. 1 shows a conventional heating pad controller which includes a "tickler" heater for regulating the different heat settings. As shown in FIG. 1, thermostats T1 and T2 sense the temperature of the heating pad which is heated by heater H3.

Additionally, thermostat T1 is in thermal contact with heater H1, a small "tickler" heater. User control is provided via switch S, which is a four position switch. In the high switch setting, contacts S3 and S4 are connected together; in the medium setting, contacts S3 and S4 are connected together and contacts S2 and S5 are connected together; in the low setting, contacts S2 and S5 are connected together; while in the off setting, contacts S1 and S6 are connected together. In the low setting, all the current flows through heater H1, which in turn heats heater H3 and thermostat T1 causing it to prematurely turn off, thus maintaining primary heater H3 at a lower overall temperature. The current also flows through heater H3 causing it to warm up. In the medium setting, some of the current is diverted through heater or resistor H2, which is more thermally isolated from thermostats T1 and T2 than heater H1. This results in heater H1 applying less heat to thermostat T1 such that thermostat T1 remains on for a relatively longer period of time, thus keeping heater H3 at a medium temperature. In the high setting, no current flows through heater H1, and thus there is no additional or accelerated heating of thermostat T1. This results in heater H3 being maintained at the highest temperature level limited only by thermostats T1 and T2 which are typically required in order to meet the prevailing safety codes for such devices.

SUMMARY OF THE INVENTION

According to the present invention, a heating pad controller is provided which varies the duty cycle during which power is applied to a heating pad heating element. In one embodiment according to the present invention, an oscillator circuit is used to vary the off-time of the duty cycle, with the on-time portion being fixed. User control of the off-time is provided by way of a rotary control knob connected to a potentiometer or alternatively one or more user controlled switches. The potentiometer is part of the oscillator circuit and is used to vary the resistance through which a capacitor in the oscillator circuit charges up. The larger the resistance set by the potentiometer, the longer the charging time of the capacitor, and the longer the off-time will be. The output of the oscillator circuit is used to control the gate of a silicon controlled rectifier (SCR), which acts as a power switch through which power is applied to the heating element. During power up, the oscillator circuit is overridden and a continuous control signal is applied to the SCR to provide constant power to the heating element to thereby achieve rapid heating.

In an alternative embodiment according to the present invention, a digital heating pad controller is provided to vary the duty cycle during which power is applied to a heating pad heating element. User control is provided by way of a number of switches which are used to select one of a number of operating temperatures. The timing which is used for power control is obtained from the 60 Hz. A.C. power signal. In effect, power is applied to the heating element via the SCR for a controlled number of 60 Hz. cycles during a given time period in order to achieve the desired temperature.

Additionally, when the heating pad is first turned on or when the desired temperature setting is increased, continuous power, i.e., 100% duty cycle operation, is initiated in order to rapidly heat the heating pad to the desired temperature. Similarly, when the desired temperature setting is decreased, no power is applied to the heating element, i.e., 0% duty cycle operation. An automatic shut off feature is also provided, whereby the circuit shuts off power to the heating element whenever a predetermined mount of time passes with no user input. Additional safety features are provided to disconnect power to the heating element in the event of a circuit malfunction.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of that embodiment, in which.

DETAILED DESCRIPTION OF THE PREFERRED EMBODIMENTS

Figure 2:
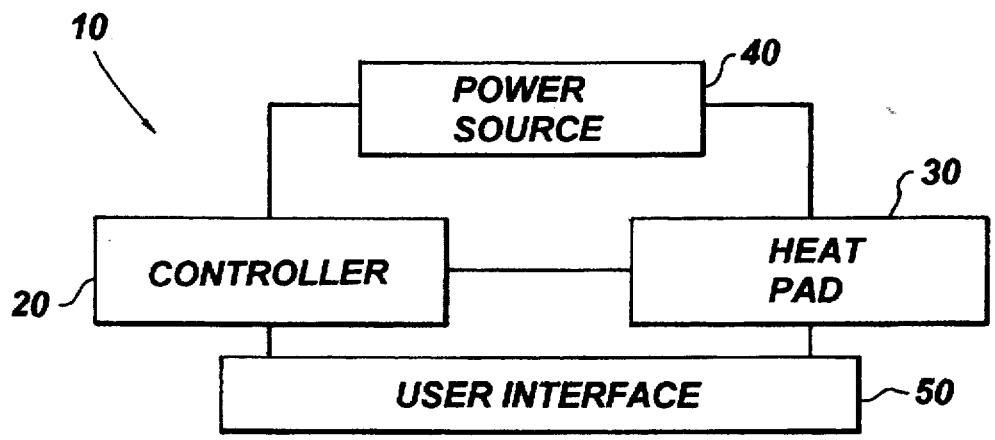
FIG. 2 is a block diagram of a heating pad control system according to the present invention.

FIG. 2 is a block diagram illustrating a heating pad control system 10 according to the present invention. Although the present description is given in terms of a heating pad, it should be understood that the present invention is likewise applicable to the control of heating devices in general. Control system 10 includes a controller 20 which controls heating pad 30. A power source 40 is supplied to both the controller 20 and the heating pad 30. Essentially, controller 20 controls the amount of power from power source 40 that is applied to heating pad 30. Heating pad 30 includes a heating element (not shown) which converts the electrical energy from power source 40 into thermal energy to produce heat. The heating element may be a resistive element through which current is passed and heat generated therein. User interface 50 is connected to both the controller 20 and the heating pad 30, and allows the user to turn the system on/off and control the desired temperature of heating pad 30.

Figure 1:
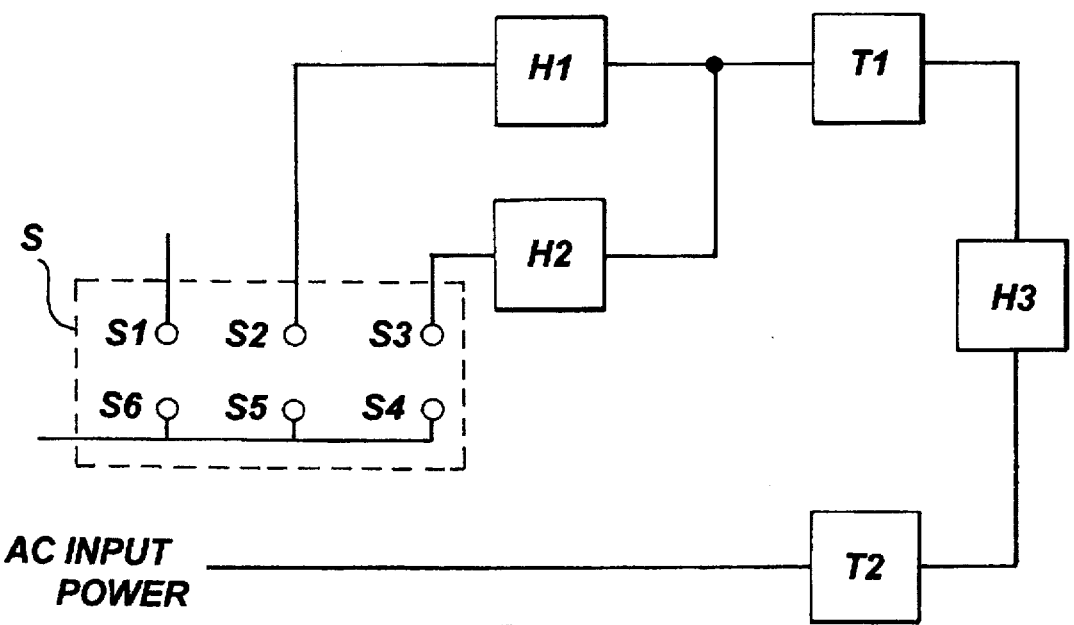
FIG. 1 is a block diagram of a prior art heating pad control system.
Figure 3:
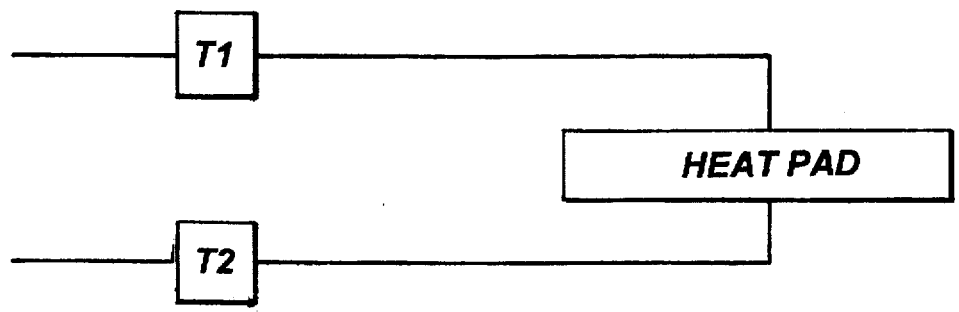
FIG. 3 is a simplified block diagram of the heating pad control system of FIG. 2.

The controller of FIG. 2 is shown in simplified form in FIG. 3. As shown in FIG. 3, the controller according to the present invention is much simpler than conventional controllers, such as that of FIG. 1. Specifically, the control circuitry and interface and wiring to the main heater are greatly simplified.

Figure 4:
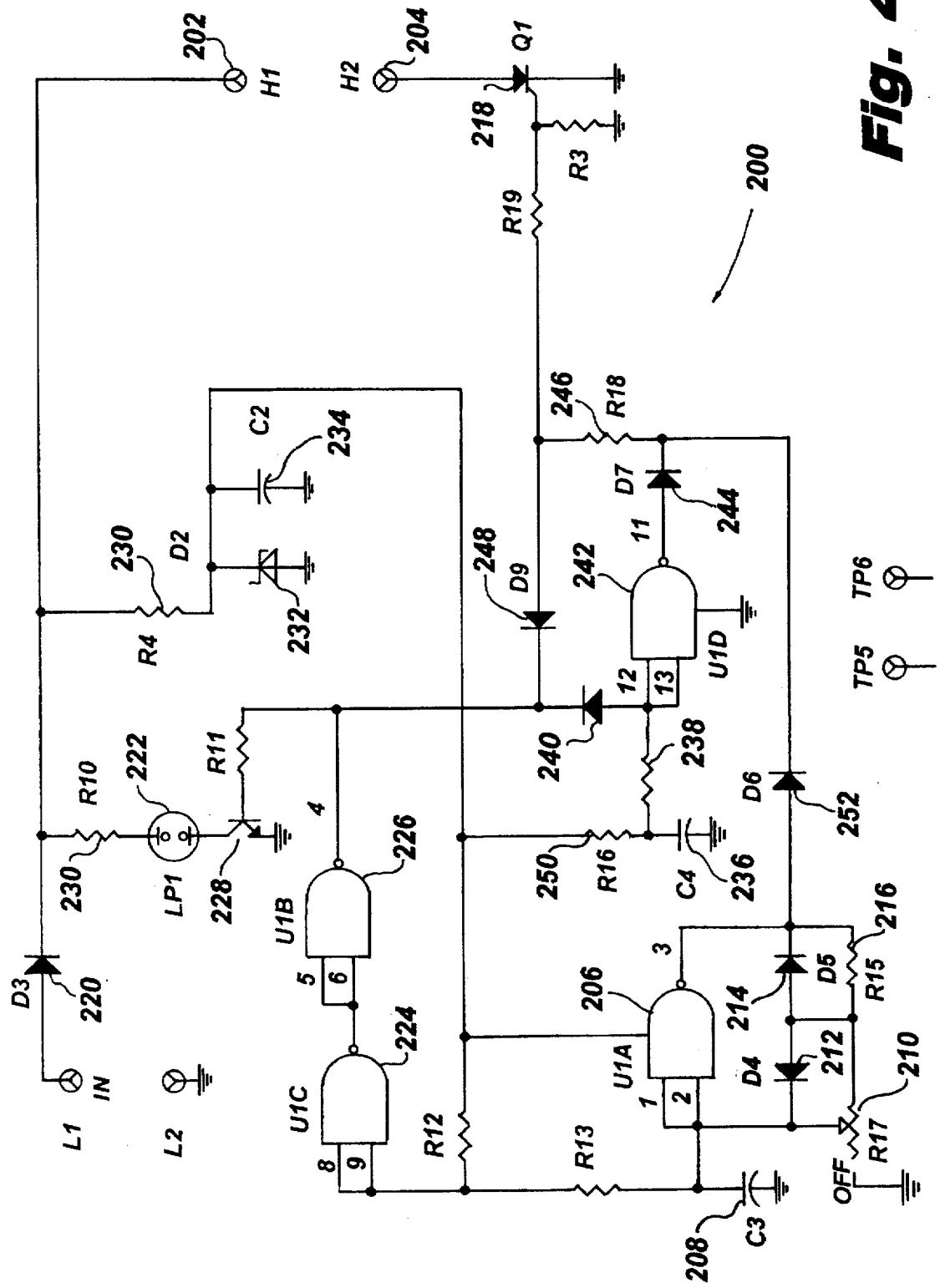
FIG. 4 is an electrical circuit schematic of a heating pad controller according to a first embodiment of the present invention.
Figure 5:
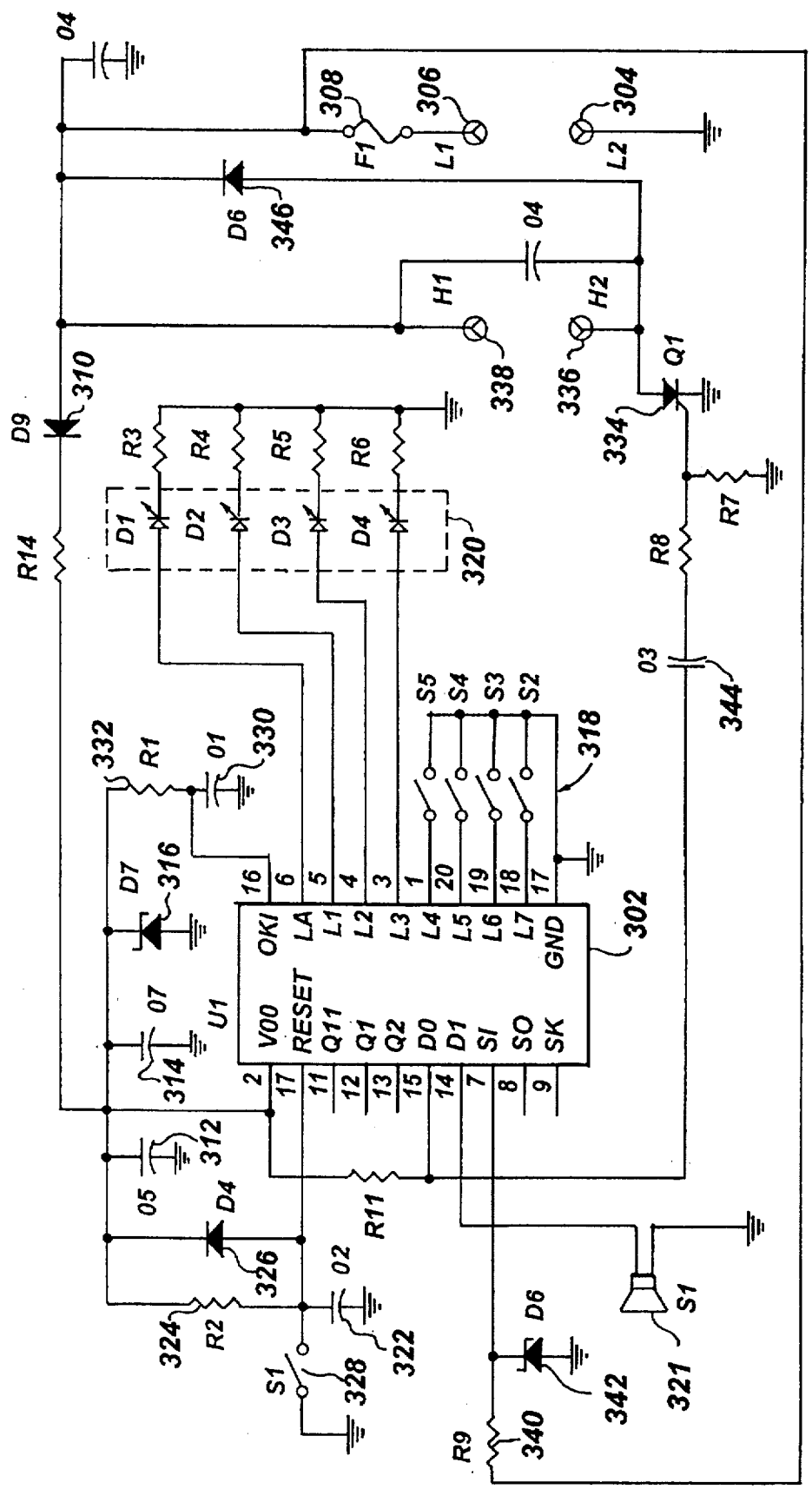
FIG. 5 is an electrical circuit schematic of a heating pad controller according to a second embodiment of the present invention.

First and second embodiments of controller 20 are shown in more detail in FIGS. 4 and 5. Referring now to FIG. 4, therein is shown controller 200 which is used to selectively provide power to a heating pad (not shown) which is connected across terminals 202 and 204.

Controller 200 includes an oscillator circuit which is used to vary the duty cycle of the power signal applied to the heating pad. The oscillator circuit includes NAND gate 206 which has both its inputs connected together and is thus configured as an inverter. It should be noted that the inputs of NAND gate 206 are Schmitt trigger inputs, which are well known to those of ordinary skill in the art. The input of NAND gate 206 is connected to the positive terminal of capacitor 208 which has its negative terminal connected to ground. The input of NAND gate 206 is also connected to the wiper arm of potentiometer 210, which has one terminal connected to ground and the other terminal connected to the anode of diode 212.

Potentiometer 210 is different from conventional potentiometers in that the wiper arm may be moved to a position where it is completely disconnected from the resistive element. When the wiper arm is disconnected from the resistive element it is brought into contact with the ground terminal. In this way, the wiper arm may be moved to ground the node connecting the cathode of diode 212 with the input of NAND gate 206. The cathode of diode 212 is connected to the input of the NAND gate 206. The anode of diode 212 is also connected to the anode of diode 214 which has its cathode connected to the output of NAND gate 206. Resistor 216 is connected across diode 214.

The operation of the oscillator circuit to produce a controlled duty cycle control signal for controlling the power applied to the heating pad will now be described in further detail. The timing of the oscillator circuit is primarily determined by the charging and discharging of capacitor 208. Initially, capacitor 208 is discharged and thus the input of NAND gate 206 is at a logic low level such that the output of NAND gate 206 is at a logic high level. Since the output of NAND gate 206 is high, diode 214 will be reverse biased and will not appreciably conduct any current. Instead, current will flow through resistor 216 and diode 212 in order to charge up capacitor 208. In this manner, capacitor 208 has a fixed charge time since it is being charged through resistor 216 which is a fixed resistance.

The fixed charge time also corresponds to a fixed on time for the heater pad because while capacitor 208 is charging, the output of NAND gate 206 is high which turns on silicon controlled rectifier (SCR) 218 thereby connecting heater pad terminal 204 to ground. The other heater pad terminal 202 is connected to the input power supply via diode 220. Diode 220 performs acts as a half wave rectifier for the input A.C. power being applied to the heater pad.

As soon as capacitor 206 charges up to the switching threshold of NAND gate 206, the output of NAND gate 206 switches to a logic low level. This results in a current discharge path from capacitor 208 through a variable resistance portion of potentiometer 210 and diode 214 to the output of NAND gate 206. Capacitor 206 then proceeds to discharge. During the discharge interval, the output of NAND gate 206 is at a logic low level such that SCR 218 is not activated and power is not being applied to the heating pad. The discharge time for capacitor 206 is controlled by the variable resistance established by potentiometer 210, i.e., the resistance between the wiper arm of potentiometer 210 and the terminal of potentiometer connected to the anode of diode 214. By increasing the variable resistance of the potentiometer, the discharge time is increased since the discharge current through the potentiometer resistance is decreased. Alternatively, the potentiometer may be replaced with a series of discrete resistances and a switching arrangement to allow the selection of a particular resistance value in order to affect the discharge time of capacitor 206.

As discussed above, the oscillator circuit produces a variable duty cycle on/off control signal for turning on/off the SCR 218. The on time is fixed and the off time is variable. For the nominal circuit values designated in FIG. 4, the on time for each cycle is approximately 200 milliseconds and the off time varies with the setting of potentiometer 210 from nearly zero to approximately 2 seconds. While the circuit shown in the accompanying figures turns on the heater during the high portion of the variable duty cycle control signal, the present invention is equally applicable so that the heater is turned on during a low portion of the variable duty cycle signal.

Controller 200 also includes an indicator lamp 222 which is illuminated during any time that controller 200 is active and power is being applied to the heating pad. For this purpose, NAND gates 224 and 226 are connected in serial to provide a buffer with sufficient current drive capability to turn on transistor 228. When transistor 228 turns on and conducts current, current flows from the power supply through resistor 230 and through lamp 222. Serially connected NAND gates 224 and 226 may of course be replaced with a buffer circuit capable of performing the above-mentioned functions. The lamp 222 is turned off when the controller 200 is turned off by moving the wiper arm of potentiometer 210 to the off position thereby grounding the wiper arm. This results in ground being applied to the input of NAND gate 224 such that the output of NAND gate 226 is at a logic low level turning off transistor 228.

The control circuitry of controller 200 is powered from a D.C. power supply generated from the input A.C. power. The D.C. power supply is generated by filtering the half wave rectified input power which is present at the cathode of diode 220. The power at the cathode of diode 220 is filtered by resistor 230, zener diode 232 and capacitor 234 to produce a filtered D.C. power supply for powering the control and logic circuitry of controller 200.

Controller 200 also includes a fast warmup circuit. The fast warmup circuit includes capacitor 236 which is quickly discharged to ground via resistor 238 and diode 240 when the controller is off. This is because when the controller 200 is off, the output of NAND gate 226 which is connected to the cathode of diode 240 is at a low logic level. The fact that the output of NAND gate 226 is at a low logic level causes the input of NAND gate 242 to be at a low logic level. Consequently, the output of NAND gate 242 will be at a high logic level. It should be understood that a buffer circuit which performs the functions of NAND gate 242, as configured, may be used instead of NAND gate 242. However, the logic high output of NAND gate 242 does not drive SCR 218 on, but rather, the output of NAND gate 242 is diverted to ground via diode 244, resistor 246 and diode 248.

When controller 200 is turned on, the output of NAND gate 226 will no longer be at ground or a logic low level. However, the input of NAND gate 242 will still be at a logic low level until capacitor 236 charges up through resistor 250. Thus, the output of NAND gate 242 will be at a logic high level and through diode 244 and resistor 246 will apply a logic high level to the gate of SCR 218 turning on SCR 218. During this time, the oscillator still runs while the output of NAND gate 206 will occasionally be at a logic low level; however, this low level signal will be blocked by diode 252 which will be reverse biased.

Capacitor 236 charges up through resistor 250 until it exceeds the threshold input for NAND gate 242. At this point, the input of NAND gate 242 becomes a logic high and the output becomes a logic low, terminating the continuous operation of SCR 218 during the rapid warm up period. The duration of the rapid warm up period is controlled by adjusting the value of resistor 250. The larger the value of resistor 250, the longer the warm up period will be since the charging current for capacitor 236 will be reduced. Conversely, the warm up period can be decreased by decreasing the value of resistor 250. With the component values designated in FIG. 4, the warm up period is approximately 3 minutes. Capacitor 236 is discharged whenever controller 200 is turned off. This is to allow a complete warm up period when controller 200 is again turned on. Capacitor 236 is discharged to ground via resistor 238 and diode 240. The value of resistor 238 should be sufficiently small to allow complete discharge within approximately 500 milliseconds. Resistor 238 prevents a complete fast warmup cycle from occurring in the event that power is removed for a brief period of time.

An alternative embodiment of a heating pad controller 300 is shown in FIG. 5. Controller 300 is a microprocessor based implementation. Microprocessor 302 is an ETL9411 4-bit microprocessor available from National Semiconductor or SGS-Thompson. It should of course be understood that any equivalent microprocessor may be used to implement controller 300. Controller 300 is powered by a D.C. power supply generated from the input A.C. power line. The A.C. power is input at terminals 304 and 306 and passes through fuse 308 which may be either a conventional glass or ceramic fuse or a fusible trace located on the printed circuit board containing controller 300. The A.C. power is then half-wave rectified by diode 310, filtered by capacitors 312 and 314 and regulated by zener diode 316 to produce a D.C. power supply.

The desired user temperature setting is set by depressing one of switches 318 which are input to pins L4–L7 of microprocessor 302. Each switch setting corresponds to a predefined temperature setting which is achieved by applying a corresponding duty cycle power signal to the heating element (not shown). Microprocessor 302 senses which input switch has been depressed and illuminates a corresponding LED or lamp indicator 320. Each LED 320 may be positioned adjacent or under a corresponding switch 318 to provide visual feedback to the user indicating that the desired switch setting has been detected by the controller 300. User feedback may also be provided via buzzer or beeper 321 which is sounded to indicate the depression of switch 318.

Microprocessor 302 is provided with a conventional power up reset circuit including capacitor 322, resistor 324 and diode 326. Additionally, switch 328 is connected to the reset circuit to allow the user to reset the circuit at any time. Switch 328 may be a momentary push-type switch. Microprocessor 302 also includes an oscillator circuit, capacitor 330 and resistor 332, for timing purposes.

Based on the particular setting of switch 318, microprocessor 302 outputs an on/off duty cycle signal to correspondingly turn SCR 334 on/off to provide the desired temperature setting. SCR 334 connects terminal 336 of the heating pad (not shown) to ground while terminal 338 is normally connected to the input A.C. power supply. Thus, power is provided to the heating pad (not shown) whenever SCR 334 is caused to turn on. The duty cycle of the control signal from microprocessor 302 to SCR 334 varies based on the desired temperature setting.

It should be noted that the power which is being applied to the heating pad is half wave rectified by SCR 334. In the embodiment shown in FIG. 4, rectifying diode 220 is in series with the pad to prevent full wave power from being applied to the heating pad in the event that SCR 218 fails in a short circuited mode. This can cause dangerously excessive heating of the heating pad before the thermostat can act to intervene. However, in the embodiment of FIG. 5, if SCR 334 fails in a short circuited mode, diode 346 will conduct sufficient current to cause fuse 308 to trip.

Also, SCR 334 only turns off at a zero crossing of the power signal that it is conducting regardless of the control signal applied at the gate of SCR 334. Thus, if SCR 334 is turned off right after a zero crossing, it will in reality turn off at the next zero crossing, i.e., a complete half cycle later. This may introduce timing errors with respect to the desired duty cycle operation. Therefore, in order to maintain precise temperature control using SCR 334, it is necessary to turn SCR 334 on/off at the appropriate time position with respect to the zero crossing of the power signal. This is achieved in controller 300 by using microprocessor 302 to monitor the zero crossings of the half wave rectified A.C. power. Specifically, resistor 340 and zener diode 342 convert the A.C. power signal into a digital signal indicative of the zero crossings of the A.C. power signal. This digital signal is monitored by microprocessor 302 and used to precisely control the on/off timing of the SCR 334 so as to substantially eliminate timing errors due to the turn off characteristics of SCR 334. It should be noted that the error which is introduced by the turn off characteristics of SCR 334 is at most one-half cycle of the A.C. power signal. The impact that this error may have on the operation of controller 300 may be further reduced by ensuring that the on period of the duty cycle is sufficiently long so as to include a large number of A.C. power cycles such that the error introduced by an additional half cycle is negligible.

Controller 300 also provides a rapid warm up feature, as well as a rapid cool down feature. Specifically, under the control of microprocessor 302, whenever controller 300 is first turned on or whenever the temperature setting is increased by the user, microprocessor provides a 100% duty cycle, i.e., continuously on, control signal for a predetermined period of time to SCR 334 to apply continuous power to the heating pad in order to more quickly arrive at the desired temperature. After the continuously on operation, microprocessor 302 switches back to the on/off duty cycle operation for that particular temperature setting.

Conversely, whenever the user temperature setting is decreased, microprocessor 302 provides a 0% duty cycle, i.e., continuously off, control signal for a predetermined period of time to SCR 334 to inhibit the application of power to the heating pad in order for the heating pad to more quickly arrive at the lower temperature setting. After the continuously off operation, microprocessor 302 switches back to the on/off duty cycle operation for that particular temperature setting.

Controller 300 included several user safety features designed to minimize and preferably eliminate any potential hazard due to the malfunctioning of controller 300. These features include an automatic shut off feature which turns off power to the heating pad when no user control, i.e., switch activation, is detected for a predetermined period of time, for example, half an hour. This is based on the premise that when no user control is detected for a sufficiently long period of time, this is a good indicator that the user has inadvertently left the heating pad on.

Similarly, if microprocessor 302 fails and sends a continuous on control signal to SCR 334, capacitor 344 charges up and A.C couples this signal so as to effectively mm off SCR 334. Additionally, if SCR 334 were to short circuit into a continuously on state, diode 346 would conduct a sufficient amount of current to open up fuse 308 and thereby cut off input power to the circuit.

While the invention has been particularly shown and described with reference to a preferred embodiment thereof, it will be understood by those skilled in the art that various changes in form and details may be made therein without departing from the spirit and scope of the invention.

We claim:

1. A controller for a heating device for controllably applying power to a heating device and controlling the heating device temperature, comprising:

an oscillator circuit having a capacitor and producing a periodic control signal at the output of said oscillator circuit, said periodic control signal including a first logic level portion and a second logic level portion;

a power switch having a control input for receiving said periodic control signal and applying power to the heating device during one of said first and second logic level portions of said control signal, otherwise disconnecting power to the heating device;

a user controlled temperature adjustment circuit connected to the oscillator circuit, including means for varying one of said first and second logic level portions of said periodic control signal to thereby vary the heating device temperature wherein the means for varying includes a variable resistor connected to said oscillator circuit capacitor for varying the discharge time of the capacitor such that one of said first and second logic level portions of said periodic control signal is varied correspondingly;

a rapid heating control circuit connected to the control input of said power switch for continuously activating said power switch for a predetermined time period upon activation of the controller to thereby rapidly increase the temperature of said heating device;. and a diode connected to said power switch and a fuse connected to said diode such that said diode conducts a sufficient amount of current to trigger said fuse in the event of a failure of said power switch.

2. A controller according to claim 1 wherein the power switch comprises a silicon controlled rectifier.

3. A controller according to claim 1 wherein the heating device comprises a heating pad.

4. A controller for a heating pad for controllably applying power to a heating pad and controlling the heating pad temperature, comprising:

a microprocessor including a plurality of inputs connected to a plurality of user temperature setting devices; a plurality of outputs connected to a plurality of temperature level indicators, each of said plurality of temperature level indicators corresponding to one of said plurality of temperature setting devices; programmable means for producing at a control output a periodic control signal having a first logic level portion and a second logic level portion;

a power switch having a control input for receiving said periodic control signal and applying power to the heating pad during one of said first and second logic level portions of said control signal, otherwise disconnecting power to the heating pad;

a diode connected to said power switch and a fuse connected to said diode such that said diode conducts a sufficient amount of current to trigger said fuse in the event of a failure of said power switch; and said microprocessor further including programmable means for varying one of said first and second logic level portions of said periodic control signal in response to the plurality of user temperature setting devices to thereby vary the heating pad temperature, programmable means for rapidly heating said heating pad by changing the periodic control signal to be continuously at one of said first and second logic levels for a first predetermined time, programmable means for rapidly cooling said heating pad by changing the periodic control signal to be continuously at the other of said first and second logic levels for a second predetermined time.

5. A controller according to claim 4, wherein said power switch comprises a silicon controlled rectifier.

6. A controller according to claim 5, further comprising:

power supply timing detection means operating in conjunction with said microprocessor for detecting zero crossings of a periodic power supply signal and adjusting a timing of said first and second logic level portions of said periodic control signal according to a predetermined relationship with respect to the power supply signal zero crossings.

7. A controller according to claim 4 wherein the heating device comprises a heating pad.

* * * * *